Jan. 8, 1935.  A. N. CRAMER  1,986,919
MACHINE FOR MAKING BLOWN HOLLOW GLASSWARE
Filed Aug. 16, 1932   3 Sheets-Sheet 2

INVENTOR
Albert N. Cramer

Jan. 8, 1935.   A. N. CRAMER   1,986,919
MACHINE FOR MAKING BLOWN HOLLOW GLASSWARE
Filed Aug. 16, 1932   3 Sheets-Sheet 3

INVENTOR
Albert N. Cramer

Patented Jan. 8, 1935

1,986,919

UNITED STATES PATENT OFFICE 1,986,919

MACHINE FOR MAKING BLOWN HOLLOW GLASSWARE

Albert N. Cramer, Toledo, Ohio, assignor, by mesne assignments, to Owens-Illinois Glass Company, Toledo, Ohio, a corporation of Ohio Application August 16, 1932, Serial No. 629,015

24 Claims. (Cl. 49—5)

The present invention relates to improvements in methods and machines for making blown hollow glassware, particularly bottles.

The device of my invention comprises features similar to those disclosed in my earlier applications Serial No. 565,563, filed September 28, 1931 and Serial No. 572,081, filed October 30, 1931. As to such similar matter, this application constitutes a continuation in part of the aforesaid applications.

Prior to my invention, continuously rotating suction gathering machines of the two table type, such as have been used for making bottles, have been confined to the dipping head type of machine, wherein the parison mold is moved in a variable path about its central column, such as is shown in the United States Patent #1,823,123 granted Karl E. Peiler September 15, 1931. The use of the two table type forming machine assures certain advantageous results in the manufacture of bottles. Heretofore, the complicated mechanism, required for dipping the parison mold into the molten glass for suction gathering, has prevented the extensive use of the two table machine in this type of device, although it is used very extensively in the gob fed type bottle machine.

Also, prior to my invention, the "re-heating" of the glass parison has occurred on the parison mold table, thereby prolonging the period of time between the gathering of the charge of glass and the transfer of the completed glass parison from the parison mold table. This results in a materially enlarged parison mold table. The "re-heating" of the glass parison is essential in the manufacture of high grade ware and in actual practice it is a period during which the glass parison is held suspended in the atmosphere after the parison mold has opened, and the internal heat of the parison tends to soften the chilled surfaces which have contacted with the iron parison mold.

Furthermore prior to my invention, in this type machine with the two mold tables positioned laterally in relation to each other, the transfer of the glass parison to the forming mold table has been effected by suspending the glass parison from the neck molds while the forming molds enclose the body of the parison, after which the neck molds are opened and the glass parison is deposited in the forming molds. This arrangement necessitates the alignment of the neck molds with the forming molds at the transfer station.

An object of the present invention is to provide a two table forming machine adapted to collect the charges of molten glass by a suction method in a vertically disposed parison mold, rotate the parison mold about a central column inclined to the vertical and the path of such rotation being in a single plane inclined to the horizontal, transfer the glass parison from the parison mold which is inclined to the vertical to a forming mold which is vertically disposed, and to expand the parison to the walls of the forming mold by a blowing operation.

Another object is to provide mechanism for transferring a glass parison from a neck mold to a forming mold while the axis of the neck mold is inclined to the axis of the forming mold.

Another object is to provide mechanism, independent of the parison mold table, to support the glass parison during an extended period of "re-heating", or temperature equalization, after its release from the molds on the parison mold table and prior to the enclosure by the forming mold on the forming mold table.

Other objects and advantages will be apparent hereinafter.

The present application discloses certain subject-matter shown and claimed in my copending application Serial Number 572,081, filed October 30, 1931.

In the accompanying drawings is shown the preferred mechanism for making glass bottles, which embodies the elements of this invention. It consists of two rotatable mold tables or carriages, upon one of which is mounted a series of spaced parison molds, and upon the other, which is positioned laterally adjacent thereto, is mounted a series of spaced finishing, or forming, molds. These tables may be continuously rotated, as shown in the accompanying drawings, or they may have interrupted, or station to station, movement, such as is commonly used in certain types of bottle machines.

Figure 1:
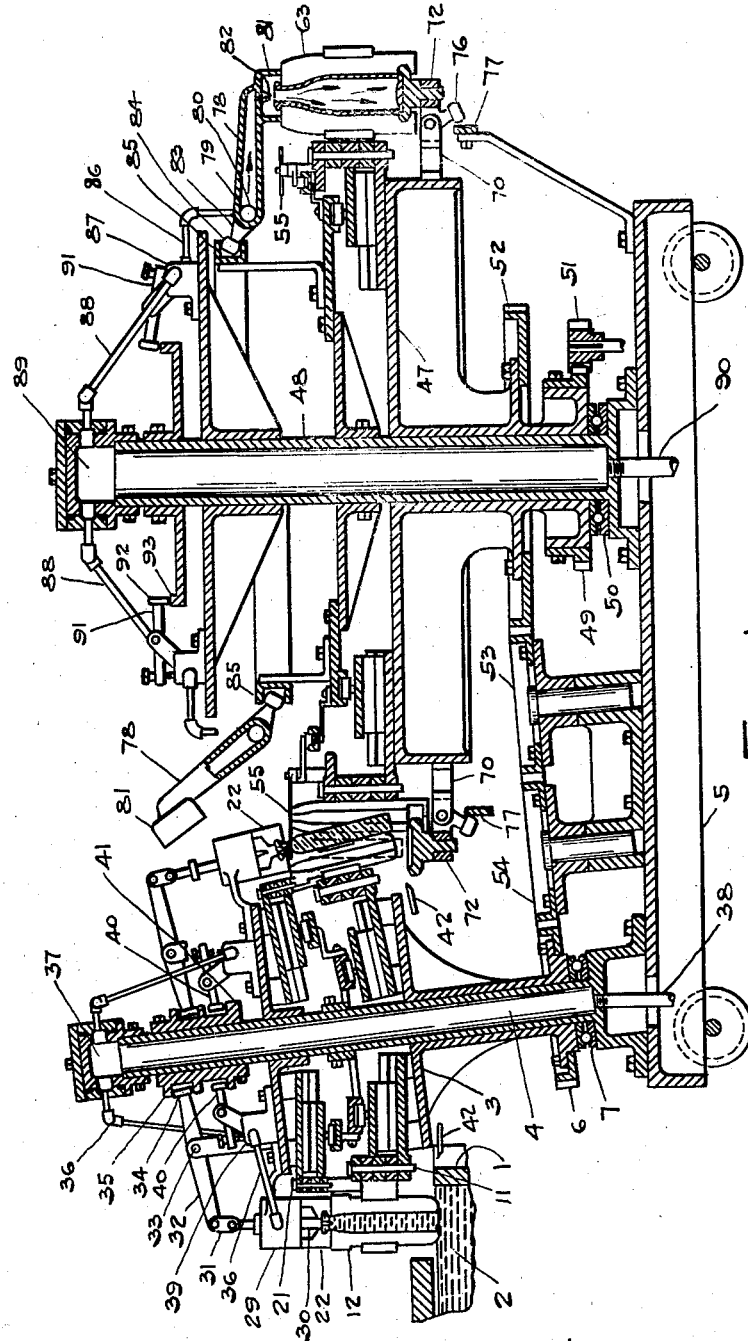
Figure 1 is a view in elevation, shown in section, of the proposed mechanism, and shows particularly the relation between the parison and forming mold tables.

Adjacent the parison mold table, as shown in Figure 1 of the drawings, is a container 1 with a pool 2 of molten glass therein. This container may be an individual receptacle, or it may be a portion of the refining chamber of a glass melting furnace. The temperature of the pool of molten glass may be maintained by burners, or in any other suitable manner, not shown.

The parison mold table or carriage 3 is rotatably mounted about the column 4, which is inclined to the vertical in the direction of the pool of molten glass, and which is secured to the base 5 of the bottle machine. Secured to the lower extension of the rotatable table 3 is a toothed gear 6 for rotating the table upon the supporting anti-friction bearing 7, in a manner later to be described.

Mounted upon the parison mold table is a series of spaced parison mold units 8, each of which comprises a partible parison mold, a partible neck mold and a plunger.

The parison mold mechanism is of a type commonly used in bottle machines, and comprises mold arms 9 and 10 pivotally supported on the pin 11 mounted in the mold unit 8. Parison or blank mold sections 12 are secured to the arms 9 and 10. These molds may be provided with vacuum passages in any usual manner, well known in the art, and shown in my previously filed application Serial No. 572,081, dated October 30, 1931. Such passages are sufficiently wide to permit exhausting the atmospheric air from the mold cavity; and are sufficiently narrow to prevent the passage of the molten glass from the mold cavity. Links 13 connect the mold arms 9 and 10 to a yoke 14, which is provided with a slide 15 controlled by the slideway 16. The roller 17, attached to the yoke 14, is engaged by the double walled cam 18, which is rigidly secured to the column 4, and is so constructed that the rotation of the parison mold table 3 will move the yoke 14 into positions to open, or close, the mold sections at predetermined stations during the cycle of rotation of the parison mold table.

The position and movement of the parison mold, during the rotation of the parison mold table, is of the utmost importance. By reference to Figure 1 of the drawings, it will be noted that the parison mold is moved in an annular path about the inclined or non-vertically disposed column 4, and that the path of such movement is in a plane inclined to the surface of the pool of molten glass. In this manner the rotating movement causes the open lower end of the parison mold to be submerged in the pool of molten glass for a portion of the cycle of rotation and sufficiently deep to seal the mold cavity from the external atmosphere, while moving in a single plane. The parison mold is positioned with its cavity inclined to the plane in which it travels and inclined towards the central column about which it rotates. The inclination of the mold cavity to the center column 4 is such that the axis of the mold cavity is brought to a vertical position while the mold is over the pool of glass, at which time the mold is at or near its lowest position. Thus, the mold cavity may be filled while its longitudinal axis is vertically disposed, and this axis may be non-vertically disposed when the glass parison is removed therefrom and transferred to a forming mold with its longitudinal axis vertically disposed.

Neck mold mechanism is similar in construction to that commonly used for parted neck molds and is positioned above the parison mold mechanism. When the neck molds are in closed position, they are aligned with the parison mold, when it is in parison forming position. It comprises neck mold arms 19 and 20, which are pivotally supported upon the pin 21 mounted on the table 3. Neck mold sections 22 are secured to the arms 19 and 20, and are provided with passages, not shown but well known in the art, to exhaust the atmospheric pressure from the mold cavities. Links 23 connect the mold arms 19 and 20 to the yoke 24, which is provided with the slide 25 controlled by the slideway 26. The roller 27 is attached to the yoke 24 and is engaged by the double walled cam 28, which is attached to the column 4, by means of the previously described cam 18. The cam 28 is so constructed that rotation of the parison mold table will move the yoke 24 into positions to open, or close, the neck mold sections at predetermined stations during the cycle of rotation of the parison mold table.

Plunger mechanism is positioned above the neck mold mechanism and in cooperative relation thereto. It comprises a commonly used vacuum head 29 rigidly secured to the parison mold table 3, and with suitable means for the guidance of the plunger 30 in alignment with the axes of the neck and parison molds when they are in closed position. Secured to the upper end of the plunger 30 is the link 31, which is connected at its upper end with the one end of the laterally disposed lever 32, which lever is pivoted at 33 and its opposite end is provided with the roller 34 controlled by the cam 35, which is rigidly secured to the column 4. The cam 35 is so constructed that the rotation of the parison mold table causes the plunger to be raised out of, or lowered into, cooperative relation with the neck mold at predetermined stations during the cycle of rotation of the table. The plunger 30, when in its lowered position, is in cooperative relation with the neck mold and forms a cavity adapted to form the mouth, or finish, of the bottle. In its upper position, it is raised sufficiently to permit the removal of the glass parison from the neck mold. The vacuum head 29 is communicatively connected by the pipe 36 to the distributing head 37, through the hollow column 4 and the pipe 38 to a suitable exhausting device, not shown. Interposed in the pipe 36 is the control valve 39 adapted to open, or close, the passageway in the pipe 36. The valve 39 is normally held in closed position by the exhausted atmosphere in the distributing head 37, and is opened by the lever 40, when actuated by the cam 41 secured to the column 4.

Figure 6:
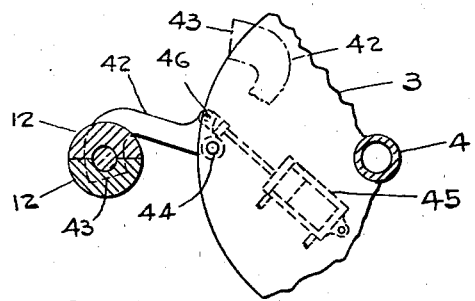
Figure 6 is a fragmentary plan view of a portion of the parison mold table, showing particularly the cut-off knife mechanism.
Figure 7:
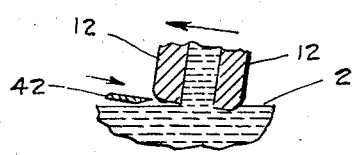
Figure 7 is a fragmentary view in elevation, shown in section, of a parison mold and the cut-off knife in position to start the cut-off operation as the parison mold emerges from the pool of molten glass.

A cut-off knife 42, as shown particularly in Figures 6 and 7 of the drawings, is positioned beneath the parison mold table. Its cutting edge 43 is in the same plane as the bottom face of the parison mold 12 and the complete knife is pivotally secured to the rotatable table 3 by the pin 44. For actuating the cut-off knife there is provided an air motor 45 pivotally mounted on the table 3 and actuated by suitable air control valves, not shown. The movable piston of the air motor 45 is connected with the cut-off knife 42 by the pin 46. As the lower end of the parison mold emerges from the pool of molten glass, the air motor 45 is extended and the cut-off knife is moved from its normal position, as indicated by the dot and dash lines in Figure 6 of the drawings, to a position where the cutting edge 43 has passed completely beneath the open end of the cavity in the parison mold 12, the position of the cut-off knife as shown in Figure 6 of the drawings in solid lines, is the position at the completion of the cut-off operation. Thus, the glass within the mold cavity may be completely severed from the mass of molten glass in the pool just as the parison mold leaves the top surface of the pool. When the glass parison has been completely formed in the mold cavity the cut-off knife 42 is returned to normal position by the reversal of the air motor 45.

Figure 5:
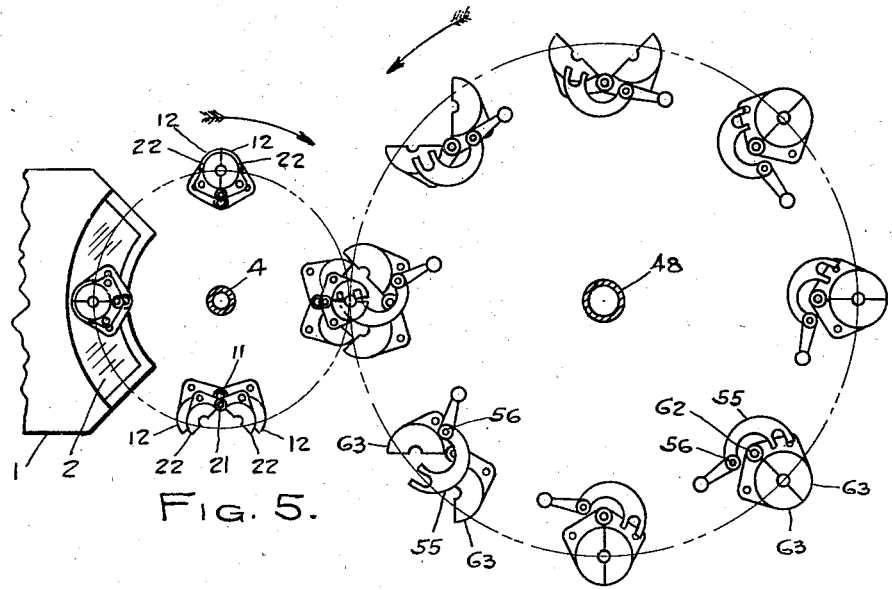
Figure 5 is a diagrammatic view, in plan, showing the mold units of the parison and forming mold tables.

The finishing mold table or carriage 47 is rotatably mounted about the vertically disposed column 48, which is rigidly secured to the base 5 in spaced relation to the column 4 of the parison mold table. Secured to the lower extension of the table 47 is the toothed gear 49, which is adapted to rotate the table upon the anti-friction bearing 50, by means of the toothed gear 51, which is driven by any suitable source of power, not shown. Positioned above the gear 49 and also secured to the table 47 is a second toothed gear 52, which is meshed, by means of the toothed gears 53 and 54, with the toothed gear 6 of the parison mold table. Thus, synchronized rotation of the parison mold and finishing mold tables is assured, and such rotation is in opposed directions, as indicated by the arrows in Figure 5 of the drawings.

Mounted upon the finishing mold table is a series of spaced finishing mold units, each comprising a support for receiving the glass parison, a parted finishing mold, a bottom plate, a blow head and the necessary operating mechanism for each.

Figure 2:
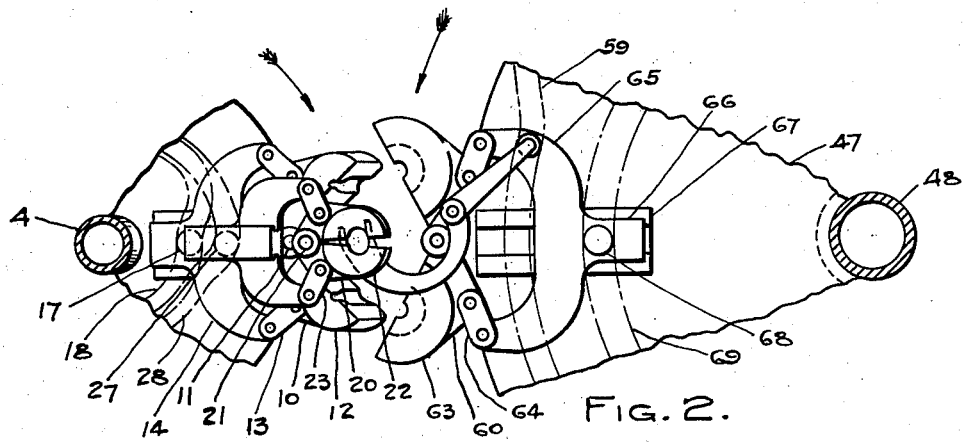
Figure 2 is a fragmentary plan view of a mold unit of the parison mold table in position to transfer the glass parison to a mold unit of the forming mold table.
Figure 3:
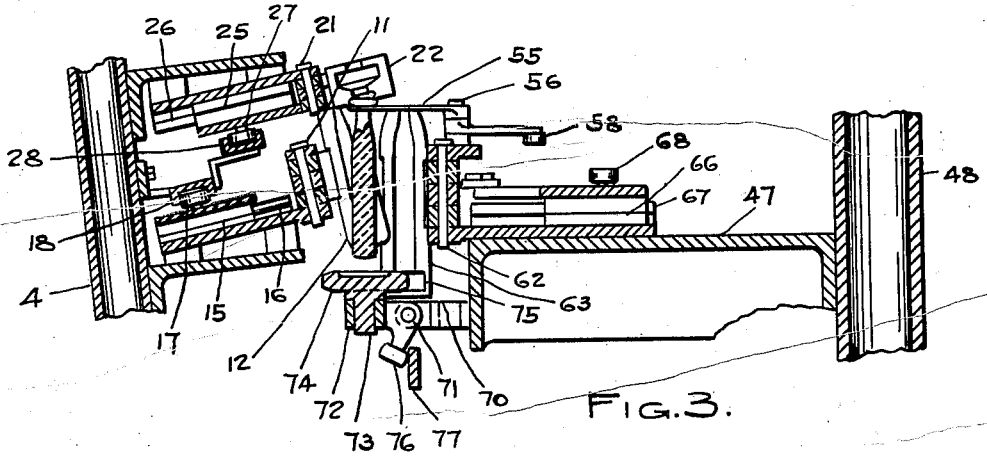
Figure 3 is a view in elevation, shown in section, of the mechanism shown in Figure 2.
Figure 4:
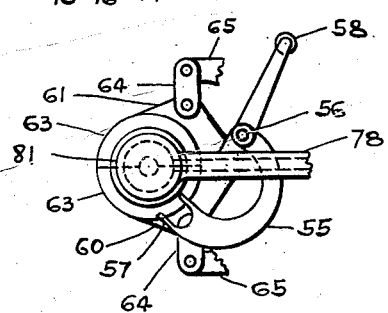
Figure 4 is a plan view of the forming mold unit with the blow head in position.

The support for receiving the glass parison and transferring it to the finishing mold, comprises a relatively thin arm 55 pivoted at 56. It is bifurcated at one end 57 to pass about the neck of the glass parison and this bifurcated end is sufficiently small that it will support the parison by means of the bead formed in the neck mold. The other end of the arm 55 is provided with the roller 58 controlled by the double walled cam 59. As shown particularly in Figure 2 of the drawings, when the glass parison is being transferred from the parison mold table to the finishing mold table, the bifurcated end 57 of the support 55 is moved in an arcuate path to enclose the neck of the glass parison while it is held in tilted position by the neck mold, after which the neck mold is opened and the glass parison drops so that the bead formed in the neck mold rests on the top surface of the arm 55; it is retained in this pendant position for a sufficient period of time for the outer surface of the parison to be re-heated by the hotter glass in the interior; the glass parison is then enclosed by the finishing mold, and the support 55 is withdrawn and the parison drops with the finish bead resting on the top surface of the closed finishing mold. In this manner a glass parison is transferred from a tilted parison mold to a vertical finishing mold. The period of time between the transfer of the glass parison to the finishing mold table and the closing of the finishing mold may be varied to suit the class of ware being made by changing the double walled cam 69 which controls the closing of the finishing mold.

The finishing mold mechanism comprises mold arms 60 and 61, which are pivotally supported by the pin 62 mounted on the rotatable table 47. Parted finishing mold sections 63 are secured to the mold arms 60 and 61, which are actuated to open, or close, the mold sections by means of the connecting links 64, which connect the mold arms to the yoke 65, which is provided with a slide 66 controlled by the slideway 67. The roller 68 attached to the yoke 65 is engaged by the double walled cam 69, which is rigidly secured to the column 48 and which is so constructed that rotation of the finishing mold table will move the yoke 65 into positions to open, or close, the mold sections at predetermined stations during the cycle of rotation of the finishing mold table.

By reference to Figure 1, of the drawings, it will be noted that the finishing mold table is moved in a horizontal plane, and that the finishing mold is vertically disposed throughout the complete cycle of rotation. This is essential in order to produce bottles with walls of uniform thickness and to insure perfectly centered, or "non-heel tapped", bottles, as part of the operation of forming high grade bottles of this type is to permit the glass parison to stretch slightly, while held suspensive prior to the actual blowing of the completed bottle.

The bottom plate mechanism comprises a bracket 70, one end of which is secured to the finishing mold table 47, and the other end of which is provided with a pin 71 upon which the bottom plate holder 72 is fulcrumed. The upper end of the holder is provided with an annular opening to receive the bottom plate 73. The annular flange 74 at the upper edge of the bottom plate 73 is adapted, when in horizontal position, to register with the annular recess 75 of the finishing mold sections 63, to insure proper alignment of the bottom plate with the finishing mold, when in operative relation therewith. The lower end of the holder 72 is provided with a roller 76, which co-acts with the cam 77 to position the bottom plate relative to the horizontal. While the finishing mold is closing about the glass parison, subsequent to its transfer from the parison mold table, the cam 77 maintains the bottom plate 73 in horizontal position while the recess 75 is enclosing the flange 74. When the finishing mold is completely closed and the bottom plate locked in position by its flange, the cam 77 releases control of the roller 76. In the structure shown in the accompanying drawings, it is contemplated that the completely blown bottle will be delivered by the commonly used method of tilting the bottom plate after the finishing molds are opened. The tilting of the bottom plate causes the bottle to become overbalanced and topple into a chute, or other suitable receptacle, not shown in the drawings, from whence it may be moved to a suitable means for annealing. To accomplish this method of delivery the cam 77 regains control of the roller 76 just prior to the opening of the finishing mold and after the bottle has been completely formed; and it retains such control while the finishing molds are opening to completely release the flange 74. At this position the cam 77 is so constructed that the bottom plate is gradually tilted from the horizontal until the bottle topples from the bottom plate and falls upon its side in the chute, or other suitable receptacle.

The blow head mechanism consists of a hollow arm 78 secured to the hollow shaft 79. The opening 80 through the wall of the shaft 79 forms a continuous passage from the hollow shaft to the hollow arm. At one end of the hollow arm 78 is provided an inverted cup 81 adapted to rest on the top surface of the finishing mold sections 63 and to non-contactingly enclose the mouth of the glass parison, which rests on the top surface of the finishing mold, as previously described. The cup 81 is so constructed that, when it is resting on the top surface of the finishing mold, the air under pressure within the cup is effectually sealed from the external atmosphere. The hollow arm 78 is constructed to form a blowing nozzle 82, within the cup 81, which nozzle directs the air under pressure to the interior of the glass parison. At the other end of the hollow arm 78 there is provided an extension 83 to which is secured the roller 84 controlled by the cam 85 secured to the column 48. The hollow shaft 79 is closed at one end, and at the other end is connected by a swivel connection to the pipe 86 and control valve 87, which controls the passage of air under pressure to the blowing nozzle. The pipe 88 connects the control valve 87 to the distributing head 89, which is supplied, through the hollow column 48 and pipe 90, with air under pressure, from any suitable source, not shown. The control valve 87 is normally held closed by the pressure of the air supplied through the pipe 88, and is provided with a lever 91 upon the end of which is mounted a roller 92 co-acting with cam 93 to open the valve and permit passage of air under pressure to the blowing nozzle at predetermined stations during the cycle of rotation of the finishing mold table.

In operation, the parison mold sections and the neck mold sections are closed and the plunger is in operative relation with the neck mold sections to form the bottle mouth, or finish, as the parison mold table is rotated to carry these molds towards the pool of molten glass. Continued rotation of the table carries the parison mold in a downwardly inclined direction to a charge gathering position over the molten glass, in which position the lower end of the mold is submerged in the glass sufficiently to close the open end of the mold cavity. At this time the vacuum valve is opened and the atmospheric air is exhausted from the mold cavity and replaced by the molten glass, which is forced therein by the pressure of the atmosphere on the surface of the pool of molten glass. Further rotation of the parison mold table raises the bottom surface of the parison mold out of the mass of molten glass. As the open end of the mold cavity emerges from the molten glass, a cut-off knife is actuated to sever the glass that is exterior of the mold cavity from that which is in the mold cavity. Thus a complete glass parison is formed. During the continued rotation of the parison mold table, the vacuum valve is closed and the plunger is withdrawn from the mouth of the parison. The parison mold, which was vertically disposed while over the pool of molten glass, is gradually tilted from the vertical during the rotation of the parison mold table, until at the transfer station the degree of inclination is maximum. When it reaches the transfer station, the parison mold is completely opened and the glass parison is supported by the neck mold. Simultaneously, the support 55 for the glass parison, which is mounted on the finishing mold table, swings into position so that the bifurcated end encloses the neck of the glass parison as the neck mold is opened. The glass parison is dropped from the neck mold to the bifurcated support, and thus the glass parison is transferred from the parison mold table to the finishing mold table. It is retained in suspended position for a period of time sufficient to permit the "enamel" on its surface to be softened by the latent heat of the interior portion, at which time the finishing mold is closed about it and the bottom plate is locked in cooperative position, as previously described. The bifurcated support is then withdrawn from beneath the bead formed in the neck mold and the parison is dropped so that this bead rests on the top surface of the finishing mold. The blow head is then lowered to seat on the top surface of the finishing mold and the control valve is actuated to permit the passage of air under pressure to the blowing nozzle directed towards the interior of the glass parison. The air under pressure is maintained upon the interior of the parison for a period of time sufficient to completely form and set the expanded parison to the walls of the finishing mold, at which time the control valve is closed and the blow head is raised from the top surface of the finishing mold. Further rotation of the finishing mold table carries the finishing mold to that position at which the finishing mold is opened, and the finished bottle stands upon its base on the bottom plate, which is held in a horizontal position by its cam. Still further rotation of the finishing mold table carries the bottom plate to the position where it is tilted, as previously described, sufficiently to deliver the bottle from the bottom plate to the chute, or other suitable receptacle.

It is not the intention to confine this invention to the particular type vacuum machine described in these specifications; it is equally applicable to other types of bottle, or forming, machines, within the spirit and scope of the appended claims.

What I claim is:

1. In combination, a bottle machine and a receptacle with molten glass therein, said machine including a parison mold vertically disposed when its lower end is immersed in said molten glass, and means for moving said parison mold in an annular closed path in a plane inclined to the surface of said molten glass.

2. In combination, a bottle machine and a receptacle with molten glass therein, said machine including a parison mold vertically disposed when its lower end is immersed in said molten glass, a stationary column inclined to the vertical, and means for rotating said parison mold about said column.

3. In combination, a bottle machine and a receptacle with molten glass therein, said machine comprising a neck mold, a parison mold, means for forming a glass parison in said neck and parison molds, means for moving said neck mold in a plane inclined to the horizontal, means for opening said parison mold, a parison supporting member adapted to move horizontally into a position beneath said neck mold and support the parison, means for opening said neck mold, and a finishing mold to enclose the parison.

4. In combination, a bottle machine and a receptacle with molten glass therein, said machine including a parison mold movable in an inclined annular closed path which is parallel throughout with an inclined plane, means for forming a glass parison in said parison mold, a vertical forming mold movable in an annular horizontal path positioned laterally of and adjoining the path of said parison mold, means for transferring said glass parison from the path of the parison mold to the path of the forming mold, and means for maintaining said forming mold in open position after such transfer.

5. In combination with a two table bottle machine, a receptacle with molten glass therein, said machine including a parison mold table positioned in an inclined plane, means for forming a glass parison, a forming mold positioned laterally in relation to said parison mold table with its longitudinal axis vertically disposed, means for transferring said glass parison from said parison mold table to said forming mold, and means for closing said forming mold independent of said transfer means.

6. In combination, a container for molten glass and a machine for forming hollow glass articles, said machine comprising means for forming a glass parison, an inclined column, means for rotating said parison about the axis of said column, a forming mold, a forming mold column, means for rotating said forming mold about the axis of said forming mold column in a path positioned laterally of and adjacent to the path of said glass parison, means for transferring said glass parison from its path about said inclined column to the path of said forming mold, and means for maintaining said forming mold in open position for a predetermined length of time after such transfer.

7. A machine for forming hollow glass articles comprising a parison mold table, a parison mold thereon, a finishing mold table, a finishing mold thereon, means for rotating said tables about separate upwardly divergent axes and thereby bringing the molds to a transfer position in which their axes are upwardly divergent, a device for supporting and transferring parisons, said device mounted for movement away from the axis of the finishing mold table, from a retracted position to an extended position in which it is in alignment with the axis of the finishing mold at said transfer position, and means for causing said device to transfer the parisons from the parison mold to the finishing mold.

8. In combination, a receptacle for molten glass, and a two table bottle machine, said machine comprising a parison mold table rotatable in an inclined plane, a neck mold and a parison mold on said table, said parison mold aligned with said neck mold and adapted to contact with said molten glass, means cooperating with said molds for forming a glass parison, a rotatable forming mold table positioned laterally in relation to said parison mold table, a forming mold mounted on said forming mold table, and a parison transfer device positioned to receive the parison from said neck mold and to deliver it to said forming mold.

9. In a machine for forming hollow glass articles, the combination of a parison mold table, a parison mold thereon, a finishing mold table, a finishing mold thereon, means for rotating said tables about laterally spaced upwardly divergent axes and thereby bringing the molds to a transfer position in which their axes are upwardly divergent, and means for transferring a parison from the parison mold to the finishing mold, said transfer means comprising a parison support mounted to swing toward the axis of the finishing mold table to a retracted position and away from said axis to an extended position in which it is aligned with the axis of the closed finishing mold, said transfer means being operable independently of the molds.

10. In a machine for forming bottles or other hollow glassware, a parison mold, means cooperating therewith for forming glass parisons within the mold, means for periodically moving the mold from a vertically disposed to an inclined position, a finishing mold having its axis inclined to that of the parison mold while the latter is in said inclined positon, and automatic means for removing parisons from the parison mold while in said inclined position and transferring them to the finishing mold.

11. A machine for forming hollow glass articles comprising a parison mold, means cooperating therewith for forming a parison therein, means for supporting the parison mold with the parison therein, in an inclined position, a vertically disposed finishing mold, and means for transferring the parison from the inclined parison mold to the vertically disposed finishing mold.

12. A machine for forming hollow glass articles comprising a parison mold table, a parison mold thereon, a finishing mold table positioned laterally of the parison mold table, a finishing mold on the finishing mold table, means for rotating said tables about separate axes and periodically bringing the molds to a transfer position, means cooperating with the parison mold for forming parisons therein, said parison mold when at the transfer station being in an inclined position and said finishing mold when at the transfer station being vertically disposed, and means for transferring parisons from the inclined parison mold to the vertically disposed finishing mold.

13. A machine for forming hollow glass articles comprising a parison mold table, a parison mold thereon, a finishing mold table positioned laterally of the parison mold table, a finishing mold on the finishing mold table, means for rotating said tables about separate axes and periodically bringing the molds to a transfer position, means cooperating with the parison mold for forming parisons therein, said parison mold when at the transfer station being in an inclined position and said finishing mold when at the transfer station being vertically disposed, a parison transfer device operable to engage a parison while the latter is supported in an inclined position, means for releasing the parison to said transfer device, and means for actuating the said transfer device and causing it to carry the bare parison from the parison mold to the finishing mold.

14. A machine for forming hollow glass articles comprising a mold carriage, a mold thereon, and means for rotating the carriage about an inclined axis and thereby causing the mold to travel in a closed path lying in an inclined plane, the mold having its axis so inclined to that of the mold carriage that when the mold is brought to its lowest position by the rotation of the mold carriage the axis of the mold is vertical.

15. A machine for forming hollow glass articles comprising a mold carriage, a mold thereon, means for rotating the carriage about an inclined axis and thereby causing the mold to travel in a closed path lying in an inclined plane, the mold having its axis so inclined to that of the mold carriage that when the mold is brought to its lowest position by the rotation of the mold carriage the axis of the mold is vertical, and means for introducing a charge of molten glass into the mold while in said vertical position.

16. A machine for forming hollow glass articles comprising a mold carriage, a parison mold thereon, means for rotating the carriage about an inclined axis and thereby causing the mold to travel in a closed path lying in an inclined plane, the mold having its axis so inclined to that of the mold carriage that when the mold is brought to its lowest position by the rotation of the mold carriage the axis of the mold is vertical, a vertical finishing mold, and automatic means for transferring a parison from the parison mold to the finishing mold while the parison mold is in an inclined position.

17. A machine for forming hollow glass articles comprising a mold carriage, a mold thereon, means for rotating the carriage about an inclined axis and thereby causing the mold to travel in a closed path lying in an inclined plane, the mold having its axis so inclined to that of the mold carriage that when the mold is brought to its lowest position by the rotation of the mold carriage the axis of the mold is vertical, and a container for a pool of molten glass so positioned that the mold when in its lowermost position dips into the glass for gathering a charge of glass by suction.

18. A machine for forming glass articles comprising a mold carriage, means for rotating the carriage about an inclined axis, a sectional mold, and arms carrying the mold sections, said arms mounted on the mold carriage to swing about a pivot, said pivot extending in a direction such that the axis of the mold is vertical when the mold is at its lowermost position.

19. A glass forming machine comprising a mold carriage, a stationary inclined column, means for rotating the carriage about said column, a sectional parison mold, and arms carrying the mold sections, said arms mounted on the mold carriage to swing about a pivot, said pivot being so inclined to the axis of the mold carriage that when the pivot is in its lowermost position it is substantially vertical.

20. The combination with a receptacle to contain a pool of molten glass, of a machine comprising a parison mold, means for moving said mold about a central column and causing it to be brought by said movement to a charging position in which it is vertically disposed with its lower end immersed in the pool of glass, means for introducing a charge of glass into the mold and forming a parison, the mold being brought by its rotation to a discharging position in which the mold and the parison therein are inclined to the vertical, and means for delivering the parison from the mold while in said inclined position.

21. The combination with a receptacle to contain molten glass, of a machine comprising a parison mold, means for transferring a charge of glass from the receptacle to the mold and forming a parison in the mold, mechanism for moving the mold from the charging position to a discharging position in which it is inclined, and means for delivering said parison from the mold while the latter is held in said inclined position.

22. The combination with a receptacle to contain molten glass, of a machine comprising a neck mold, a parison mold in register therewith and having its axis in line with the axis of said neck mold, means for transferring a charge of glass from the receptacle to said molds and forming a parison therein, means for opening the parison mold, means for holding the neck mold with its axis inclined to the vertical, means for delivering the parison from the neck mold while the latter is in said inclined position, and means for supporting the parison in a pendant position after such delivery.

23. The combination with a receptacle for molten glass, of a two-table machine for forming bottles or other ware, said machine comprising a parison mold adapted to contact with the glass in said receptacle, means for introducing a charge of glass into the mold and forming a parison therein, means for holding the mold and parison therein in an inclined position, a support, and means for causing the support to receive said parison from the mold while the latter is in said inclined position.

24. The combination with a receptacle to contain molten glass, of a bottle machine comprising a neck mold, a parison mold in register therewith, means for forming a parison in the combined neck and parison molds, means for moving the combined molds in a plane inclined to the horizontal and thereby bringing them to a delivery position, means for opening the parison mold, a supporting member, means for moving said member in a horizontal plane in a path extending beneath the neck mold, means for opening the neck mold at said delivery position and thereby delivering the parison to said supporting member, a finishing mold, and means for closing it about the parison.

ALBERT N. CRAMER.